US009443464B2

(12) United States Patent
Song et al.

(10) Patent No.: US 9,443,464 B2
(45) Date of Patent: Sep. 13, 2016

(54) STAGE CIRCUIT AND ORGANIC LIGHT EMITTING DISPLAY DEVICE USING THE SAME

(71) Applicant: Samsung Display Co., Ltd., Yongin, Gyeonggi-Do (KR)

(72) Inventors: Hwa-Young Song, Yongin (KR); Dong-Hwi Kim, Yongin (KR); Min-Kyu Woo, Yongin (KR); Ji-Hye Kim, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 487 days.

(21) Appl. No.: 13/678,206

(22) Filed: Nov. 15, 2012

(65) Prior Publication Data

US 2013/0342584 A1 Dec. 26, 2013

(30) Foreign Application Priority Data

Jun. 21, 2012 (KR) ........................ 10-2012-0066777

(51) Int. Cl.

*G09G 5/10* (2006.01)
*G06F 3/038* (2013.01)
*G09G 5/00* (2006.01)
*G09G 3/30* (2006.01)
*G09G 3/32* (2016.01)

(52) U.S. Cl.

CPC .............. *G09G 3/30* (2013.01); *G09G 3/3266* (2013.01)

(58) Field of Classification Search

CPC ................... G09G 3/3266; G09G 2310/0286; G09G 2310/0267
USPC ....... 257/43; 327/94; 345/76, 204, 211–212, 345/690; 714/726
See application file for complete search history.

(56) References Cited

U.S. PATENT DOCUMENTS

2009/0174692 A1* 7/2009 Park ..................... G09G 3/3648 345/204
2010/0177023 A1* 7/2010 Han ..................... G11C 19/184 345/76
2011/0109599 A1* 5/2011 Han ..................... G09G 3/3266 345/204
2011/0193892 A1* 8/2011 Eom .................... G09G 3/3266 345/690
2011/0227883 A1* 9/2011 Chung ................. G09G 3/3266 345/204
2011/0273417 A1* 11/2011 Shin ......................... G09G 3/20 345/211

(Continued)

FOREIGN PATENT DOCUMENTS

KR 10-0714003 4/2007
KR 10-1056213 8/2011

(Continued)

*Primary Examiner* — Lin Li
(74) *Attorney, Agent, or Firm* — Robert E. Bushnell, Esq.

(57) ABSTRACT

An organic light emitting display device having a stage circuit capable of creating a scan signal and a light emitting control signal. The stage circuit includes a control unit controlling a first node and a second node corresponding to signals of a first input terminal, a third input terminal, and a fourth input terminal, a first output unit supplying a light emitting control signal to a second output terminal corresponding to voltages at the first node and the second node, and a second output unit supplying a scan signal having different polarity than that of the light emitting control signal to a first output terminal corresponding to a signal of a second input terminal and voltages at the first node and the second node.

16 Claims, 5 Drawing Sheets

(56) References Cited

U.S. PATENT DOCUMENTS

| | | | | |
|---|---|---|---|---|
| 2012/0062525 | A1* | 3/2012 | Kim | G09G 3/3233 345/204 |
| 2012/0212517 | A1* | 8/2012 | Ahn | 345/690 |

FOREIGN PATENT DOCUMENTS

| | | |
|---|---|---|
| KR | 10-1101105 | 12/2011 |
| KR | 10-1146990 | 5/2012 |

* cited by examiner

STAGE CIRCUIT AND ORGANIC LIGHT EMITTING DISPLAY DEVICE USING THE SAME

CROSS-REFERENCE TO RELATED APPLICATION

This application makes reference to, incorporates the same herein, and claims all benefits accruing under 35 U.S.C. §119 from an application earlier filed in the Korean Intellectual Property Office on 21 Jun. 2012 and there duly assigned Serial No. 10-2012-0066777.

BACKGROUND OF THE INVENTION

1. Field of the Invention

The present invention relates to a stage circuit and an organic light emitting display device using the same, and more particularly, to a stage circuit capable of creating a scan signal and a light emitting control signal and an organic light emitting display device using the same.

2. Description of the Related Art

Recently, various flat panel display devices capable of reducing weight and volume which is are disadvantages of a cathode ray tube have been developed. As these flat panel display devices, there are a liquid crystal display (LCD), a field emission display (FED), a plasma display panel (PDP), an organic light emitting display (OLED), and the like.

Among them, the organic light emitting display device displays an image using an organic light emitting diode generating light by recombination between electrons and holes. The organic light emitting display device described above has advantages in which it has a rapid response speed and is driven at a low power. The general organic light emitting display device uses a transistor formed in each pixel to supply current corresponding to a data signal to the organic light emitting diode, thereby allowing the organic light emitting diode to generate light.

The organic light emitting display device as described above is configured to include a data driving unit supplying data signals to data lines, a scan driving unit sequentially supplying scan signals to scan lines, a light emitting control line driving unit sequentially supplying light emitting control signals to light emitting control signals, and a pixel unit including a plurality of pixels connected to the scan lines and the data lines.

Pixels included in the pixel unit are selected when the scan signal is supplied to the scan line, and the selected pixels receive the data signal from the data line. The pixels receiving data signals display an image while generating light having a predetermined brightness corresponding to the data signal. In addition, the pixels are set to a non-light-emitting state corresponding to a light emitting control signal supplied from the light emitting control line during a period of time in which the data signal is charged to the pixels.

Meanwhile, the scan driving unit includes stages each connected to the scan lines and the light emitting control line driving unit includes stages each connected to the light emitting control lines. Here, each of stages includes a plurality of transistors and a plurality of capacitors.

In the case in which the stages are mounted on the panel, a first mounting area to mount the stages of the scan driving unit and a second area to mount the stages of the light emitting control line driving unit are required. That is, according to the prior art, the stages of the scan driving unit and the stages of the light emitting control line driving unit are mounted on different areas, such that a dead space increases. Particularly, in a portable device it is difficult to minimize the thickness and width of the panel due to the first mounting area and the second mounting area.

SUMMARY OF THE INVENTION

Therefore, an object of the present invention is to provide a stage circuit capable of generating a scan signal and a light emitting control signal and an organic light emitting display device using the same.

According to one aspect of the present invention in order to achieve the object, there is provided a including: a control unit controlling a first node and a second node corresponding to signals of a first input terminal, a third input terminal, and a fourth input terminal; a first output unit supplying a light emitting control signal to a second output terminal corresponding to voltages at the first node and the second node; and a second output unit supplying a scan signal having different polarity than that of the light emitting control signal to a first output terminal corresponding to voltages at the first node and the second node and a signal of a second input terminal.

The first input terminal may receive a clock signal, the second input terminal may receive a second clock signal, the third input terminal may receive the control signal, and the fourth input terminal may receive a scan signal of a previous stage or a start signal. The first clock signal and the second clock signal may have the same cycle and phases of the first clock signal and the second clock signal may not overlap with each other. The start signal may be supplied so as to overlap with the first clock signal. The phase of the control signal may not overlap with those of the first clock signal and the second clock signal.

The first output unit may include: a first transistor connected between a first power supply and the second output terminal, and having a gate electrode connected to the second node; a second is transistor connected between the second output terminal and a second power supply having voltage set lower than that of the first power supply, and having a gate electrode connected to the first node; and a first capacitor connected between the second output terminal and the first node.

The second output unit may include: a third transistor connected between the first power supply and the first output terminal, and having a gate electrode connected to the first node; a fourth transistor connected between the first output terminal and the second input terminal, having a gate electrode connected to the second node; and a second capacitor connected between the first output terminal and the second node.

The control unit may include: a fifth transistor connected between the first power supply and the first node, and having a gate electrode connected to the fourth input terminal; a sixth transistor connected between the first node and the second power supply having voltage set lower than that of the first power supply, and having a gate electrode connected to the third input terminal; a seventh transistor connected between the first power supply and the second node, and having a gate electrode connected to the first node; and an eighth transistor connected between the second node and the fourth input terminal, having a gate electrode connected to the first input terminal.

Each of the fifth transistor and the seventh transistor may consist of a plurality of transistors connected in series with each other. The state circuit may comprise a bi-directional driving unit connected between the fourth input terminal and the seventh input terminal and the control unit. The bi-directional driving unit may include: a ninth transistor connected between the fourth input terminal and the control unit, and turned on when a first bi-directional control signal is supplied; and a tenth transistor connected between the seventh input terminal and the control unit, and turned on when a second bi-directional control signal is supplied. The fourth input terminal may receive a scan signal of a previous stage or a start signal, the seventh input terminal may receive a scan signal of a next stage or a start signal.

According to another aspect of the present invention in order to achieve the object, there is provided an organic light emitting display device including: pixels positioned in regions divided by scan lines, light emitting control lines, and data lines; a data driving unit supplying data signals to the data lines; and a scan/light emitting driving unit including a plurality of stages each connected to a scan line and a light emitting control line in order to supply scan signals to the scan lines and supply light emitting signals to the light emitting control lines, and each of the stage includes: a control unit controlling a first node and a second node corresponding to signals of a first input terminal, a third input terminal, and a fourth input terminal; a first output unit supplying a light emitting control signal to a second output terminal corresponding to the first node and the second node; and a second output unit supplying a scan signal having different polarity than that of the light emitting control signal to a first output terminal corresponding to voltages at the first node and the second node and a signal of a second input terminal.

The fourth input terminal may receive a scan signal of a previous stage or a start signal. A first input terminal and a second input terminal of the odd-number-th stage may receive a first clock signal and a second clock signal, respectively, and a first input terminal and a second input terminal of the even-number-th stage may receive the second clock signal and the first clock signal, respectively. The first clock signal and the second clock signal may have the same cycle and phases of the first clock signal and the second clock signal do not overlap with each other. A third input terminal of the j-th (j=1, 4, 7, . . . ) stage may receive a first control signal, a third input terminal of the j+1-th stage may receive a second control signal, and a third input terminal of the j+2-th stage may receive a third control signal. The first, second, and third control signals may have the same cycle and phases of the first, second, and third control signals may not overlap with one another. Phases of the first, second, and third control signals may not overlap with the clock signals supplied to the first input terminal and the second input terminal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
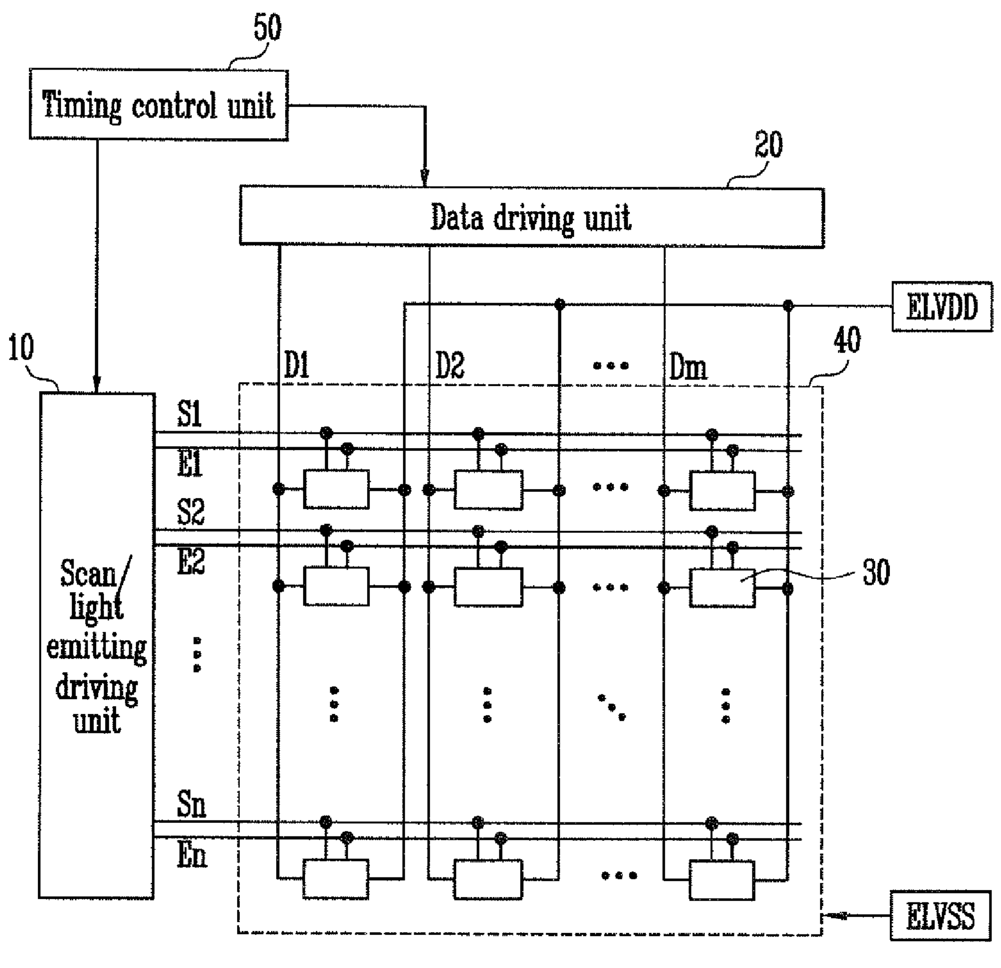
FIG. 1 is a view showing an organic light emitting display device according to an exemplary embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereafter, exemplary embodiments of the prevent invention which those skilled in the art may easily practice will be described below in detail with reference to FIG. 1 to FIG. 5.

FIG. 1 is a view showing an organic light emitting display device according to an exemplary embodiment of the present invention.

Referring to FIG. 1, the organic light emitting display device is configured to include a pixel unit 40 including pixels 30 positioned at intersections of scan lines S1 to Sn, light emitting control lines E1 to En, and data lines D1 to Dm, a scan/light emitting driving unit 10 driving the scan lines S1 to Sn and the light emitting control lines E1 to En, a data driving unit 20 driving the data lines D1 to Dm, and a timing control unit 50 controlling the scan/light emitting driving unit 10 and the data driving unit 20.

The scan/light emitting driving unit 10 drives the scan lines S1 to Sn and light emitting is control lines E1 to En. In other words, the scan/light emitting driving unit 10 supplies scan signals sequentially to the scan lines S1 to Sn and light emitting control signals sequentially to the light emitting control lines E1 to En. Here, the scan/light emitting driving unit 10 supplies a light emitting control signal to the i-th (i is a natural number) light emitting control line Ei, so as to be overlapped with the scan signal supplied to the i-th scan line Si. To this end, the scan/light emitting driving unit 10 includes a plurality of stages, and each of the plurality of stages is connected to the scan line and the light emitting control line.

Meanwhile, when the scan signals are supplied to the scan lines S1 to Sn, the pixels 30 are selected in a horizontal line unit. In addition, when light emitting control signals are supplied to the light emitting control lines E1 to En, the pixels 30 is set to a non-light emitting state in a horizontal line unit. To this end, the scan signal and the light emitting signal are set to have different polarities. As an example, when the scan signal is set to a low voltage, the light emitting control signal is set to a high voltage.

The data driving unit 20 supplies data signals to the data lines D1 to Dm so as to synchronize with scan signals. Here, the pixels 30 selected by the scan signals are charged with voltage corresponding to the data signals.

The timing control unit 50 supplies control signals (not shown) in order to control the scan/light emitting driving unit 10 and the data driving unit 20. In addition, the timing control unit 50 supplies data (not shown) supplied from the outside to the data driving unit 20.

The pixels 30 store voltages corresponding to the data signals and generate light having predetermined brightness while supplying current corresponding to the stored voltage to the organic light emitting diode (not shown). Meanwhile, the pixels may be configured as currently known circuits of various forms supplied with the scan signal and the light emitting signal.

Figure 2:
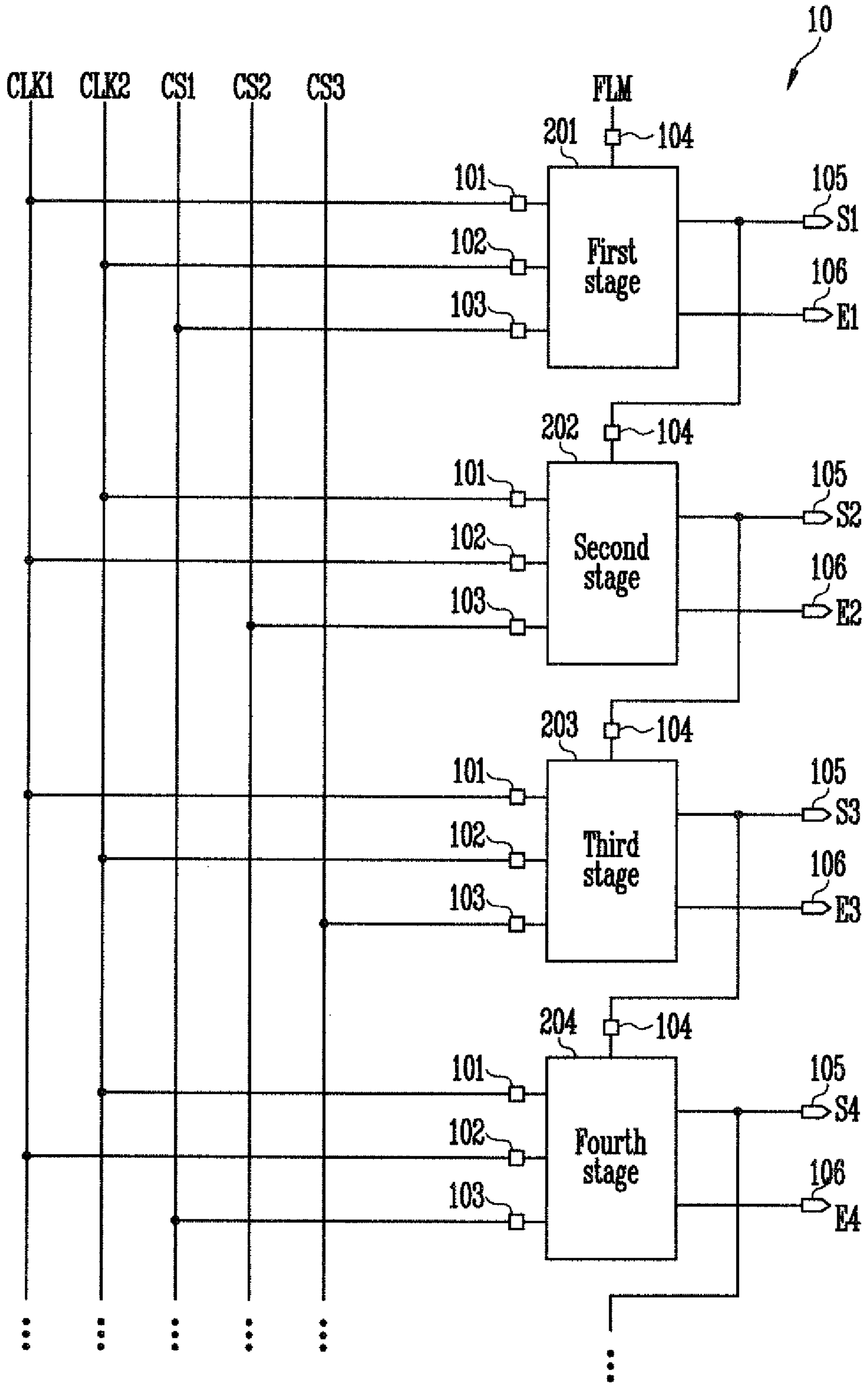
FIG. 2 is a view showing an example of a stage configuration of a scan/light emitting driving unit shown in FIG. 1.

FIG. 2 is a view showing an example of a stage configuration of the scan/light emitting driving unit 10 shown in FIG. 1. In FIG. 2, four stages will be described for convenience of description.

Referring to FIG. 2, the scan/light emitting driving unit 10 includes a plurality of stages 201 to 204, each of which is connected to a scan line and a light emitting control line. Each stage 201 to 204 has the same circuit configuration. The stages 201 to 204 described above supplies scan signals sequentially to the scan lines S1 to Sn and light emitting control signals sequentially to the light emitting control lines E1 to En.

Each of the stages 201 to 204 is driven by two clock signals CLK1 and CLK2 and a control signal (one of CS1 to CS3). To this end, each of the stages 201 to 204 includes a first input terminal 101, a second input terminal 102, a third input terminal 103, a fourth input terminal 104, a first output terminal 105, and a second output terminal 106.

The first input terminal 101 and the second input terminal 102 included in the odd-number-th (or the even-number-th) stage receive the first clock signal CLK1 and the second clock signal CLK2, respectively. The first input terminal 101 and the second input terminal 102 included in the even-number-th stage receive the second clock signal CLK2 and the first clock signal CLK1, respectively.

Here, the first clock signal CLK1 and the second clock signal CLK2 have the same cycle and are sequentially supplied so that phases of them do not overlap with each other. As an example, the first clock signal CLK1 and the second clock signal CLK2 have a cycle of 2 horizontal periods 2H and are supplied in different horizontal periods.

In addition, the third input terminal 103 included the j-th stage (j=1, 4, 7, . . . ) receives the first control signal CS1, the third input terminal 103 included in the j+1-th stage receives the second control signal CS2, and the third input terminal 103 included in the j+2-th stage receives the third control signal CS3.

Here, the first control signal CS1 and the second clock signal CS2 have the same cycle and are sequentially supplied so that phases of them do not overlap with each other. As an example, the first control signal CS1 and the third clock signal CS3 have a cycle of 3 horizontal periods 3H and are supplied in different horizontal periods. In addition, the phases of the first control signal CS1 to the third control signal CS3 do not overlap with any of those of the first clock signal CLK1 and the second clock signal CLK2. In addition, each of the phases of the first control signal CS1 to the is third control signal CS3 may be supplied between those of the first clock signal CLK1 and the second clock signal CLK2.

The fourth input terminal 104 included in each of the stages 201 to 204 receives a sampling signal (that is, scan signal) of the previous stage. Here, the first input terminal 104 included in the first state 201 receives a start signal FLM. In addition, the first output terminal 105 of each of the stages 201 to 204 receives the scan signal to supply it to the scan line S1-Sn, respectively, and the second output terminal 106 of each of the stages 201 to 204 receives the light emitting control signal to supply it to the light emitting control line E1-En, respectively.

Figure 3:
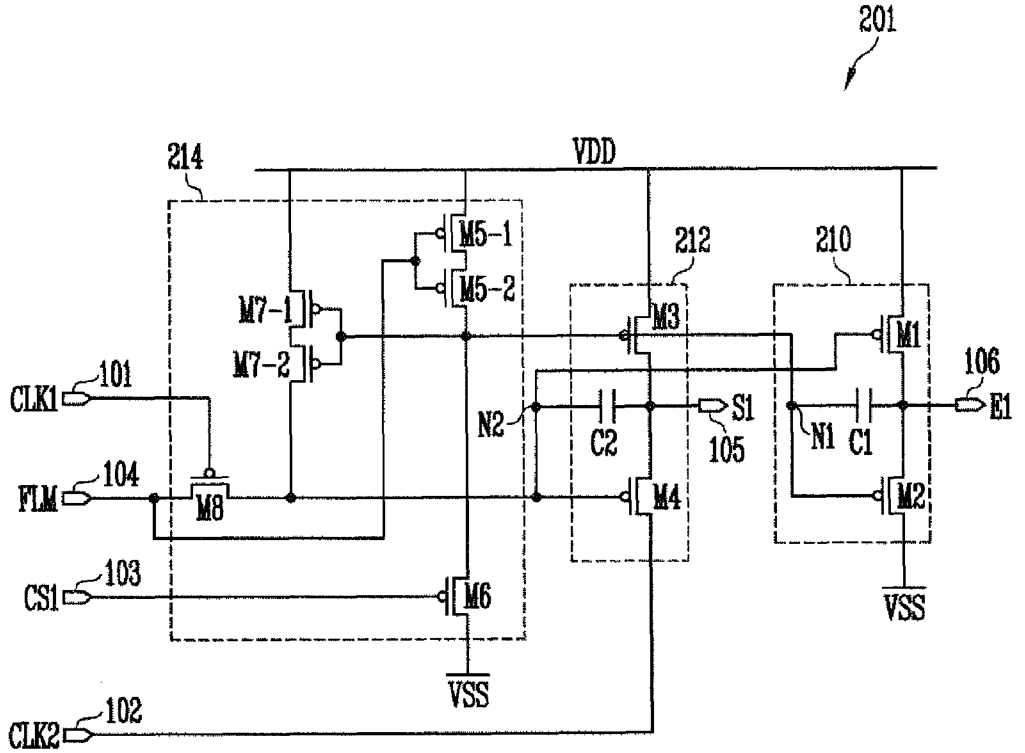
FIG. 3 is a view showing an example of the stage shown in FIG. 2.

FIG. 3 is a view showing an example of the stage shown in FIG. 2. In FIG. 3, the first stage is shown for convenience of description.

Referring to FIG. 3, the stage 201 according to the exemplary embodiment of the present invention includes a first output unit 210, a second output unit 212, and a control unit 214.

The first output unit 210 supplies light emitting control signals to the second output terminal 106 corresponding to voltages applied to a first node N1 and a second node N2. To this end, the first output unit 210 includes a first transistor M1, a second transistor M2, and a first capacitor C1.

The first transistor M1 is connected between a first power supply VDD and the second output terminal 106. The first transistor M1 is turned on or off corresponding to a voltage applied to the second node N2. When the first transistor M1 is turned on, voltage of the first power supply VDD is supplied to the second output terminal 106, and the voltage of the first power supply VDD is supplied to the light emitting control line E1 as the light emitting control signal.

The second transistor M2 is connected between the second output terminal 106 and a second power supply VSS with a voltage that is lower than that of the first power supply VDD. The second transistor M2 is turned on or off corresponding to a voltage applied to the first node N1. When the second transistor M2 is turned on, voltage of the second power supply VSS is supplied to the second output terminal 106. In this case, the supply of the light emitting control signal to the light emitting control line E1 is stopped.

The first capacitor C1 is connected between a first node N1 and the second output terminal 106. The first capacitor C1 is charged with a voltage applied to the first node N1.

The second output unit 212 supplies the scan signal to the first output terminal 105 corresponding to voltages applied to the first node N1 and the second node N2 and the second clock signal CLK2 supplied to the second input terminal 102 (or the first clock signal). To this end, the second output unit 212 includes a third transistor M3, a fourth transistor M4, and a second capacitor C2.

The third transistor M3 is connected between the first power supply VDD and the first output terminal 105. The third transistor M3 is turned on or off corresponding to a voltage applied to the first node N1. When the third transistor M3 is turned on, voltage of the first power supply VDD is supplied to the first output terminal 105. In this case, the scan signal is not supplied to the scan line S1.

The fourth transistor M4 is connected between the first output terminal 105 and the second input terminal 102. The fourth transistor M4 is turned on or off corresponding to a voltage applied to the second node N2. When the fourth transistor M4 is turned on, the first output terminal 105 and the second input terminal 102 are electrically connected to each other. Here, the second clock signal CLK2 supplied to the second input terminal 102 is supplied to the scan line S1 as the scan signal.

The second capacitor C2 is connected between a second node N2 and the first output terminal 105. The second capacitor C2 is charged with voltage applied to the second node N2.

The control unit 214 controls voltages at the first node N1 and the second node N2 corresponding to signals supplied to the first input terminal 101, the third input terminal 103, and the fourth input terminal 104. To this end, the control unit 214 includes fifth through eighth transistors M5-M8.

The fifth transistor M5 (the fifth transistor M5 is configured of a plurality of transistors M5-1, M5-2 connected in series with each other so that leakage current flowing from the first power supply VDD to the first node N1 is minimized) is connected between the first power supply VDD and the first node N1. The fifth transistor M5 is turned on or off corresponding to the signal is supplied to the fourth input terminal 104. As an example, when the start signal (the scan signal of the previous stage) is supplied to the fourth input terminal 104, the fifth transistor M5 is turned on, thereby supplying voltage of the first power supply VDD to the first node N1. Although the fifth transistor M5 is configured of two transistors M5-1 and M5-2 connected in series with each other for convenience of description in FIG. 3, the present invention is not limited thereto.

The sixth transistor M6 is connected between the first node N1 and the second power supply VSS. The sixth transistor M6 is turned on or off corresponding to the signal supplied to the third input terminal 103. As an example, when the first control signal CS1 is supplied to the third input terminal 103, the sixth transistor M6 is turned on, thereby supplying voltage of the second power supply VSS to the first node N1.

The seventh transistor M7 (the seventh transistor M7 consists of a plurality of transistors M7-1, M7-2 connected in series with each other so that leakage current flowing from the first power supply VDD to the second node N2 is minimized) is connected between the first power supply VDD and the second node N2. The seventh transistor M7 is turned on or off corresponding to a voltage applied to the first node N1. When the seventh transistor M7 is turned on, voltage of the first power supply VDD is supplied to the second node N2. Although the seventh transistor M7 consists of two transistors M7-1 and M7-2 connected in series with each other for convenience of description in FIG. 3, the present invention is not limited thereto.

The eighth transistor M8 is connected between the fourth input terminal 104 and the second node N2. When the first clock signal CLK1 is supplied to the first input terminal 101, the eighth transistor M8 is turned on, thereby electrically connecting the fourth input terminal 104 to the second node N2.

Figure 4:
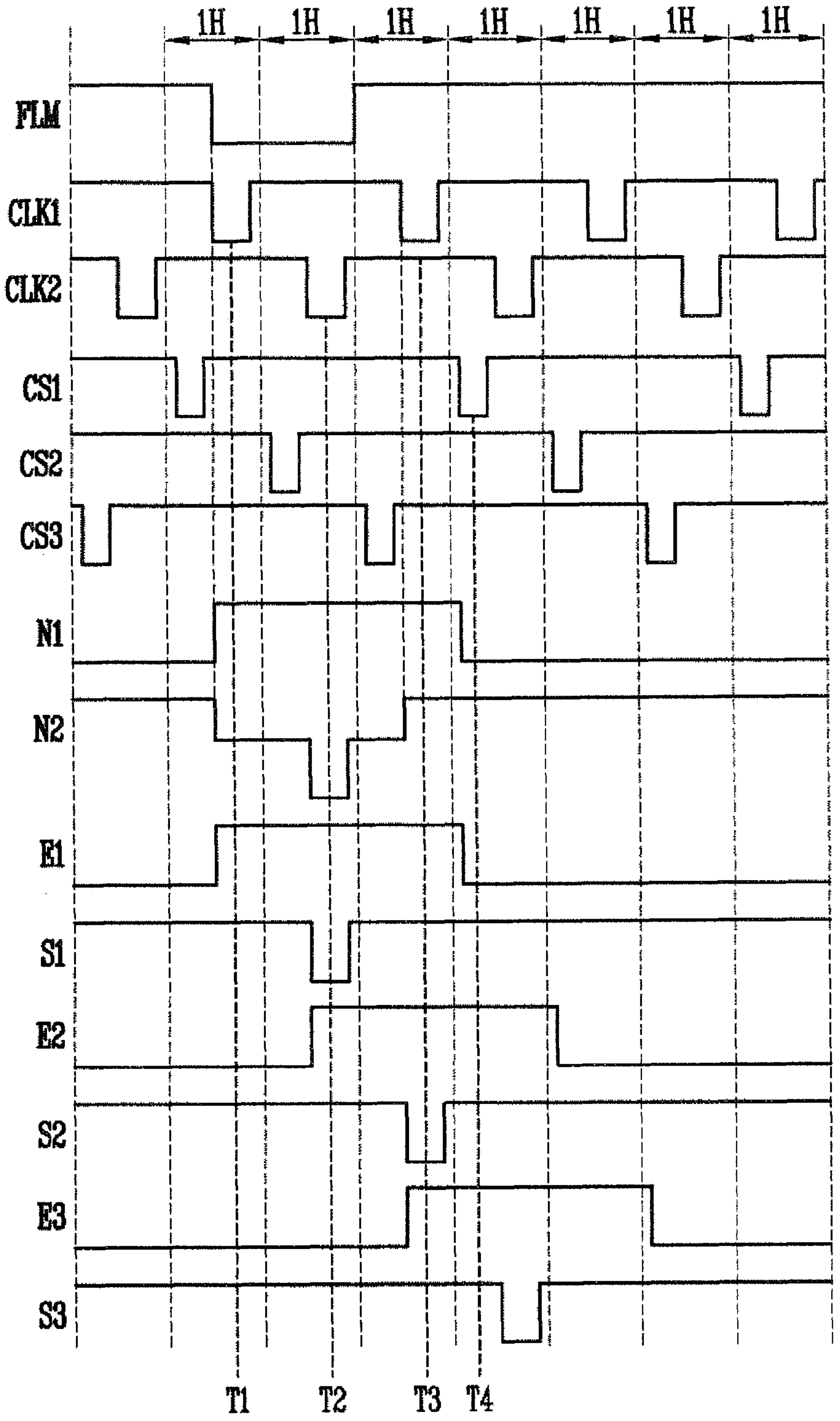
FIG. 4 is a waveform diagram showing a method of driving a stage.

FIG. 4 is a waveform diagram showing a method of driving a stage.

Referring to FIG. 4, firstly, the first clock signal CLK1 and the start signal FLM are supplied in a first period T1. The start signal FLM is supplied to the fourth input terminal 104 such that the fifth transistor M5 is turned on. When the fifth transistor M5 is turned on, voltage of the first power supply VDD (high voltage) is supplied to the first node N1. When voltage of the first power is supply VDD is supplied to the first node N1, transistors M2, M3, and M7 connected to the first node N1 are set to a turn-off state.

The clock signal CLK1 is supplied to the first input terminal 101 such that the eighth transistor M8 is turned on. When the eighth transistor M8 is turned on, the start signal FLM (low voltage) is supplied to the second node N2. When the start signal is supplied to the second node N2, the first transistor M1 and the fourth transistor M4 are turned on. When the first transistor M1 is turned on, voltage of the first power supply VDD, that is the light emitting control signal is supplied to the second output terminal 106. When the fourth transistor M4 is turned on, the first output terminal 105 and the second input terminal 102 are electrically connected to each other. Here, since the second clock signal CLK2 is not supplied to the second input terminal 102, the scan signal is not supplied to the first output terminal 105 (that is, high voltage is maintained).

In the second period T2, the second clock signal CLK2 is supplied to the second input terminal 102. At this time, since the fourth transistor M4 is set to a turn-on state by voltage charged in the second capacitor C2, the second clock signal CLK2 supplied to the second input terminal 102 is supplied to the first output terminal 105. The second clock signal CLK2 supplied to the first output terminal 105 is supplied to the scan line S1 as the scan signal.

In a third period T3, the supply of the start signal FLM is stopped and also the first clock signal CLK1 is supplied. When the supply of the start signal FLM is stopped, the fourth input terminal 104 is set to high voltage, such that the fifth transistor M5 is turned on. When the first clock signal CLK1 is supplied, the eighth transistor M8 is turned on. When the eighth transistor M8 is turned on, the fourth input terminal 104 and the second node N2 are connected to each other, such that the second node N2 is set to high voltage. When the second node N2 is set to high voltage, the fourth transistor M4 and the first transistor M1 are turned on. In this case, the first transistor M1 and the second transistor M2 are set to a turn-off state, such that the second output terminal 106 is set to a floating state. At this time, the second output terminal 106 maintains voltage of the first power supply VDD, that is, voltage of the light emitting control signal by a parasitic capacitor and the first capacitor C1 connected to the light emitting control line E1.

In the fourth period T4, the first control signal CS1 is supplied to the third input terminal 103. When the first control signal CS1 is supplied to the third input terminal 103, the sixth transistor M6 is turned on. When the sixth transistor M6 is turned on, voltage of the second power supply VSS is supplied to the first node N1. When the voltage of the second power supply VSS is supplied to the first node N1, the second transistor M2, the third transistor M3, and the seventh transistor M7 are turned on. When the second transistor M2 is turned on, voltage of the second power supply VSS is supplied to the first output terminal 106, such that the supply of the light emitting control signal to the light emitting control line E1 is stopped. When the third transistor M3 is turned on, voltage of the first power supply VDD is supplied to the second output terminal 105. When the seventh transistor M7 is turned on, voltage of the first power supply VDD is supplied to the second node N2. When voltage of the first power supply VDD is supplied to the second node N2, the fourth transistor M4 and the first transistor M1 are turned off. Therefore, during a fourth period, the scan signal (i.e., CLK2) is not supplied to the first output terminal 105 (that is, first output terminal 105 is high voltage), and the light emitting control signal (i.e., VDD) is not supplied to the second output terminal 106 (that is, second output terminal 106 is low voltage).

Meanwhile, the scan signal output during the second period T2, which is the start signal of the second stage 202, is supplied simultaneously with the second clock signal CLK2. Here, during the second period T2, the light emitting control signal is supplied to the second light emitting control line E2. In addition, after the fourth period T4 the light emitting control signal supplied to the second light emitting control line E2 is maintained until the period during which the second control signal CS2 is supplied. In addition, during the third period T3, the second state 202 supplies the first clock signal CLK1 to the second scan line S2 as the scan signal.

According to the present invention, while the above-mentioned processes are being repeated, the scan/light emitting driving unit 10 scan signals are supplied sequentially to the scan lines S1 to Sn and the light emitting control signals are supplied sequentially to the light emitting control lines E1 to En.

Figure 5:
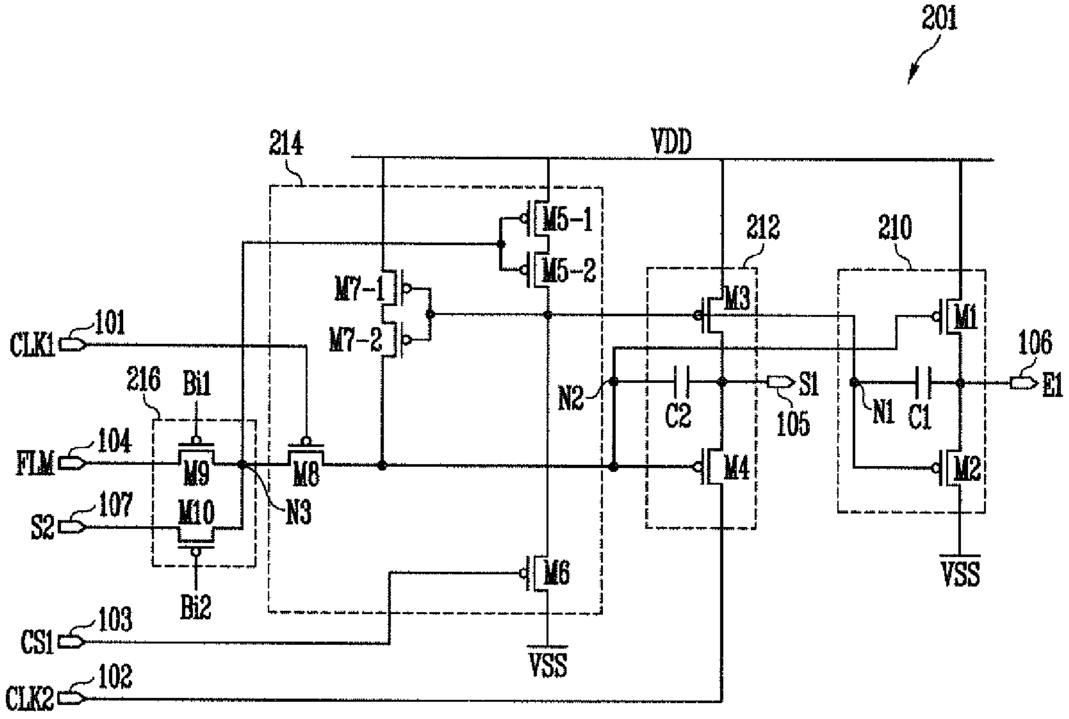
FIG. 5 is a circuit diagram showing another example of the stage shown in FIG. 2.

FIG. 5 is a view showing another example of the stage shown in FIG. 2.

In FIG. 5, the same reference numerals will be used to designate the same components as those of FIG. 3. Therefore a detailed description thereof will be omitted.

Referring to FIG. 5, a stage according to another exemplary embodiment of the present invention further includes a bi-directional driving unit 216.

The bi-directional driving unit 216 controls directions of the scan signal and the light emitting control signal such that each of them may be supplied in a first direction (forward direction) or a second direction (backward direction). To this end, the bi-directional driving unit 216 includes a ninth transistor M9 and a tenth transistor M10.

The ninth transistor M9 is connected between a third node N3 (which is a common node of the eighth transistor M8 and the fifth transistor M5) and the fourth input terminal 104. The ninth transistor M9 is turned on when a first bi-directional control signal Bi1 is supplied. Here, the fourth input terminal 104 receives the scan signal (or start signal FLM) of the previous stage.

The tenth transistor M10 is connected between the third node N3 and the seventh input terminal 107. The tenth transistor M10 is turned on when a second bi-directional control signal Bi2 is supplied. Here, the seventh input terminal 107 receives the scan signal S2 (or start signal) of the next stage.

Schematically describing an operation process, the ninth transistor M9 is turned on when the first bi-directional control signal Bi1 is supplied. When the ninth transistor M9 is turned on, each of the stages is driven corresponding to the scan signal of the previous stage, such that the scan signal and the light emitting control signal are sequentially supplied in the first direction.

In addition, when the second bi-directional control signal Bi2 is supplied, the tenth transistor M10 is turned on. When the tenth transistor M10 is turned on, each of the stages is driven corresponding to the scan signal of the previous stage, such that the scan signal and the light emitting control signal are sequentially supplied in the second direction. Since other driving processes have been described in connection with FIGS. 3 and 4, a detailed description will be omitted.

As set forth above, the stage circuit according to the exemplary embodiments of the present invention and the organic light emitting display device using the same may create scan signals and light emitting control signals using a stage, thereby making it possible to minimize the mounting area of the driving unit. Particularly, in the case in which the driving unit according to the exemplary embodiment of the present invention, is applied to a portable device, the dead space is minimized, thereby making it possible to minimize thickness and width of the panel.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A stage circuit comprising:

a control unit controlling voltage at first node and a second node in response to a first clock signal input to a first input terminal, an input control signal input to a third input terminal, and a scan signal of a previous stage or a start signal input to a fourth input terminal;

a first output unit supplying a light emitting control signal to a second output terminal in direct response to the voltages at the first node and the second node; and a second output unit having a second input terminal, the second output unit supplying a scan signal having different polarity than that of the light emitting control signal to a first output terminal corresponding to a second clock signal input to the second input terminal and in direct response to the voltages at the first node and the second node, wherein the first output unit includes:

a first transistor connected between a first power supply and the second output terminal, and having a gate electrode connected to the second node;

a second transistor connected between the second output terminal and a second power supply having voltage set lower than that of the first power supply, and having a gate electrode connected to the first node; and a first capacitor connected between the second output terminal and the first node, and the second output unit includes:

a third transistor connected between the first power supply and the first output terminal, and having a gate electrode connected to the first node;

a fourth transistor connected between the first output terminal and the second input terminal, having a gate electrode connected to the second node; and a second capacitor connected between the first output terminal and the second node.

2. The stage circuit according to claim 1, wherein the first clock signal and the second clock signal have the same cycle, and phases of the first clock signal and the second clock signal do not overlap with each other.

3. The stage circuit according to claim 1, wherein the start signal is supplied so as to overlap with the first clock signal.

4. The stage circuit according to claim 1, wherein the phase of the input control signal does not overlap with the phases of the first clock signal and the second clock signal.

5. The stage circuit according to claim 1, wherein the control unit includes:

a fifth transistor connected between the first power supply and the first node, and having a gate electrode connected to the fourth input terminal;

a sixth transistor connected between the first node and the second power supply having the voltage set lower than that of the first power supply, and having a gate electrode connected to the third input terminal;

a seventh transistor connected between the first power supply and the second node, and having a gate electrode connected to the first node; and an eighth transistor connected between the second node and the fourth input terminal, having a gate electrode connected to the first input terminal.

6. The stage circuit according to claim 5, wherein each of the fifth transistor and the seventh transistor consists of a plurality of transistors connected in series with each other.

7. The stage circuit according to claim 1, further comprising:

a bi-directional driving unit connected between the fourth input terminal and a seventh input terminal and the control unit.

8. The stage circuit according to claim 7, wherein the bi-directional driving unit includes:

a ninth transistor connected between the fourth input terminal and the control unit, and turned on when a first bi-directional control signal is supplied;

a tenth transistor connected between the seventh input terminal and the control unit, and turned on when a second bi-directional control signal is supplied.

9. The stage circuit according to claim 7, wherein the seventh input terminal receives a scan signal of a next stage or the start signal.

10. An organic light emitting display device comprising:

pixels positioned in regions divided by scan lines, light emitting control lines, and data lines;

a data driving unit supplying data signals to the data lines; and a scan/light emitting driving unit including a plurality of stages each connected to a scan line and a light emitting control line in order to supply scan signals to the scan lines and supply light emitting signals to the light emitting control lines, wherein each stage includes:

a control unit controlling voltages at a first node and a second node corresponding to one of a first clock signal and a second clock signal input to a first input terminal, an input control signal input to a third input terminal, and a scan signal of a previous stage or a start signal input to a fourth input terminal;

a first output unit supplying a light emitting control signal to a second output terminal corresponding to the first node and the second node; and a second output unit supplying a scan signal having different polarity than that of the light emitting control signal to a first output terminal corresponding to the other one of the first clock signal and the second clock signal input to a second input terminal and voltages at the first node and the second node, such that the first input terminal and the second input terminal of an odd-number-th stage receive the first clock signal and the second clock signal, respectively, and the first input terminal and the second input terminal of an even-number-th stage receive the second clock signal and the first clock signal, respectively, wherein the third input terminal of a j-th (j=1, 4, 7,. . .) stage receives a first control signal, the third input terminal of a j+1-th stage receives a second control signal, and the third input terminal of a j+2-th stage receives a third control signal, wherein the light emitting control signal is supplied during a substantially same period of time in one frame period in each of the plurality of stages.

11. The organic light emitting display device according to claim 10, wherein the first clock signal and the second clock signal have the same cycle, and phases of the first clock signal and the second clock signal do not overlap with each other.

12. The organic light emitting display device according to claim 10, wherein the first, second, and third control signals have the same cycle, and phases of the first, second, and third control signals do not overlap with one another.

13. The organic light emitting display device according to claim 12, wherein the phases of the first, second, and third control signals do not overlap with the clock signals supplied to the first input terminal and the second input terminal.

14. The organic light emitting display device according to claim 10, wherein the first output unit includes:

a first transistor connected between a first power supply and the second output terminal, and having a gate electrode connected to the second node;

a second transistor connected between the second output terminal and a second power supply having voltage set lower than that of the first power supply, and having a gate electrode connected to the first node; and a first capacitor connected between the second output terminal and the first node.

15. The organic light emitting display device according to claim 10, wherein the second output unit includes:

a third transistor connected between the first power supply and the first output terminal, and having a gate electrode connected to the first node;

a fourth transistor connected between the first output terminal and the second input terminal, and having a gate electrode connected to the second node; and a second capacitor connected between the first output terminal and the second node.

16. The organic light emitting display device according to claim 10, wherein the control unit includes:

a fifth transistor connected between the first power supply and the first node, and having a gate electrode connected to the fourth input terminal;

a sixth transistor connected between the first node and the second power supply having voltage set lower than that of the first power supply;

a seventh transistor connected between the first power supply and the second node, and having a gate electrode connected to the first node; and an eighth transistor connected between the second node and the fourth input terminal, and having a gate electrode connected to the first input terminal.

* * * * *